(12) United States Patent
Choi et al.

(10) Patent No.: US 12,122,539 B2
(45) Date of Patent: Oct. 22, 2024

(54) NTAC AUGMENTED NUCLEAR ELECTRIC PROPULSION AND/OR NUCLEAR THERMAL PROPULSION

(71) Applicant: UNITED STATES OF AMERICA AS REPRESENTED BY THE ADMINISTRATOR OF NASA, Washington, DC (US)

(72) Inventors: Sang H. Choi, Poquoson, VA (US); Robert W. Moses, Poquoson, VA (US); Dennis M. Bushnell, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 17/564,911

(22) Filed: Dec. 29, 2021

(65) Prior Publication Data
US 2022/0267031 A1    Aug. 25, 2022

Related U.S. Application Data

(60) Provisional application No. 63/153,632, filed on Feb. 25, 2021.

(51) Int. Cl.
*B64G 1/40* (2006.01)
*F03H 1/00* (2006.01)
*G21D 5/02* (2006.01)
*G21D 7/04* (2006.01)

(52) U.S. Cl.
CPC .......... *B64G 1/408* (2013.01); *F03H 1/0037* (2013.01); *G21D 5/02* (2013.01); *G21D 7/04* (2013.01)

(58) Field of Classification Search
CPC . G21D 5/02; G21D 7/04; B64G 1/408; B64G 1/409; B64G 1/411; B64G 1/413; F03H 1/0037
See application file for complete search history.

(56) References Cited

U.S. PATENT DOCUMENTS

| | | | | |
|---|---|---|---|---|
| 5,428,653 | A * | 6/1995 | El-Genk | G21D 5/02 376/382 |
| 10,269,463 | B2 | 4/2019 | Choi et al. | |
| 2005/0089130 | A1* | 4/2005 | Moriarty | G21C 15/257 376/361 |

(Continued)

OTHER PUBLICATIONS

A Nuclear Electric Propulsion Vehicle for Planetary Exploration Eugene V. Pawlik and Wayne M. Phillips Journal of Spacecraft and Rockets 1977 14:9, 518-525 (Year: 1977).*

(Continued)

*Primary Examiner* — Sharon M Davis
(74) *Attorney, Agent, or Firm* — M. Bruce Harper; Robin W. Edwards; Trenton L. Roche

(57) ABSTRACT

The present disclosure is directed to a system including a nuclear thermal rocket or a nuclear reactor, at least one nuclear electric thruster coupled to the nuclear thermal rocket or the nuclear reactor, and a Nuclear Thermionic Avalanche Cell (NTAC) configured to generate electrical power. The NTAC cell may be positioned around a nuclear reactor core of the nuclear thermal rocket or the nuclear reactor, and the nuclear electric thruster may be powered by the NTAC generated electrical power.

6 Claims, 20 Drawing Sheets

(56) References Cited

U.S. PATENT DOCUMENTS

| | | | |
|---|---|---|---|
| 2005/0151022 A1* | 7/2005 | D'Ausilio | B64G 1/422 |
| | | | 244/171.1 |
| 2016/0049210 A1* | 2/2016 | Filippone | F22B 1/063 |
| | | | 376/406 |
| 2016/0225476 A1* | 8/2016 | Choi | G21H 1/04 |
| 2019/0392961 A1* | 12/2019 | Choi | G21H 1/04 |

OTHER PUBLICATIONS

"Energy Release from Fission," Nuclear Power, Jan. 25, 2022, pp. 1-6.

Finseth, J. L., Overview of Rover Engine Tests—Final Report NASA-CR-184270, Rover Nuclear Rocket Engine Program, 1991, pp. 1-266, George C. Marshall Flight Center, Huntsville, Alabama.

"Ultra Safe Nuclear Technologies Delivers Advanced Nuclear Thermal Propulsion Design to NASA," Ultra Safe Nuclear, Oct. 19, 2020, pp. 1-5, Seattle.

"TRISO Particles: The Most Robust Nuclear Fuel on Earth," Office of Nuclear Energy, Jul. 9, 2019, pp. 1-6, Washington DC.

Bess, John D., "Benchmark Evaluation of the Start-Up Core Reactor Physics Measurements of the High Temperature Engineering Test Reactor", PHYSOR 2010, Advances in Reactor Physics to Power the Nuclear Renissance, May 12, 2010, pp. 1-12, Idaho Falls, ID.

Bryan, J. C., in Introduction to Nuclear Science, Boca Raton, CRC Press, vol. 7.2, Section 7.2.2, 2018, p. 161.

"Note on NIST X-ray Attenuation," NIST, 2016, pp. 1-4.

Chen, Q.F. et al., "Equation of state of partially ionized argon plasma", AIP Physics of Plasma, AIP Publishing LLC., 2011, pp. 1-7, vol. 18, Issue 112704.

Katz, et al. "Technologies to Improve Ion Propulsion System Performance, Life and Efficiency", STAIF-2003-118, pp. 1-11, Pasadena, California.

Kubota, K., et al., "Numerical Investigation of Ionization and Acceleration Processed in a Self-Field MPD Thruster," 29th International Electric Propulsion Conference, Princeton University, IEPC-2005-089, 2005, pp. 1-9.

* cited by examiner

Table III. NTAC Layers with γ-absorption.

| Photon Energy (MeV) | Layer 1 Emitter | Layer 1 Collector | Layer 1 Insulator | Layer 1 Emitter | Layer 2 | Layer 3 | Layer 4 | Layer 5 | Layer 6 | Layer 7 | Total NTAC Layer # |
|---|---|---|---|---|---|---|---|---|---|---|---|
| 0.6 | La 0.1399 | Cu 0.0646 | SiO₂ 0.0619 | La 0.1399 | | | | | | | 4 |
| 1.25 | 0.0885 | 0.0456 | 0.0442 | 0.0885 | | | | | | | 6 |
| 7 | 0.0680 | 0.0272 | 0.0209 | 0.0680 | | | | | | | 8 (3%) |
| 0.6 | Ga 0.1893 | Cu 0.0646 | SiO₂ 0.0619 | Ga 0.1893 | | | | | | | 3 |
| 1.25 | 0.1147 | 0.0456 | 0.0442 | 0.1147 | | | | | | | 5 |
| 7 | 0.0911 | 0.0272 | 0.0209 | 0.0911 | | | | | | | 7 |
| 0.6 | Re 0.4826 | Cu 0.0646 | SiO₂ 0.0619 | Re 0.4826 | | | | | | | 1 |
| 1.25 | 0.2914 | 0.0456 | 0.0442 | 0.2914 | | | | | | | 2 |
| 7 | 0.2408 | 0.0272 | 0.0209 | 0.2408 | | | | | | | 3 |
| 0.6 | Au 0.4769 | Cu 0.0646 | SiO₂ 0.0619 | Au 0.4769 | | | | | | | 1 |
| 1.25 | 0.2777 | 0.0456 | 0.0442 | 0.2777 | | | | | | | 2 |
| 7 | 0.2289 | 0.0272 | 0.0209 | 0.2289 | | | | | | | 3 |

Vacuum Gaps

FIG. 4

NTAC AUGMENTED NUCLEAR ELECTRIC PROPULSION AND/OR NUCLEAR THERMAL PROPULSION

CROSS-REFERENCE TO RELATED PATENT APPLICATION

This patent application claims the benefit of and priority to U.S. Provisional Patent Application No. 63/153,632, filed on Feb. 25, 2021, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

BACKGROUND OF THE INVENTION

Conventional types of nuclear propulsion include Nuclear Thermal Propulsion (NTP) and Nuclear Electric Propulsion (NEP). In both types, a nuclear reactor generates heat energy to increase the temperature of propellant or the generated heat energy is converted into electric power to run electric propulsion systems. For example, electric propulsion systems may include Hall thruster, magnetoplasma dynamic (MPD) thruster, variable specific impulse magnetoplasma rocket (VASIMR), etc. NTP and NEP systems rely only on the thermal energy output generated from nuclear reaction for propulsion. It is well-known that nuclear fission reactions generate about 7 MeV level prompt gamma ray emissions. There are also auxiliary emissions, such as the transmitted part of 7 MeV, the Compton gamma rays, the Bremsstrahlung, and the induced X-rays, which are originated from the activations and/or collisions by neutrons, gamma rays, and energetic particles through fuel rod, cladding, and housing materials. There are also emissions from the by-products, such as Cesium-137, from nuclear fission reactions. Accordingly, most conventional NTP and NEP system designs include a safety feature to shield the system components from gamma rays and neutrons released by the nuclear fission reaction. In contrast to these known systems, the systems and methods disclosed herein utilize the device structure of a Nuclear Thermionic Avalanche Cell (NTAC) coupled to a NTP or a NEP system for safely converting released radiation energy safely into usable electrical power, while shielding system components from gamma rays, that will power NEP thrusters. Prior art energy conversion systems using a NTAC are described in U.S. Pat. No. 10,269, 463, the contents of which are hereby incorporated by reference in their entirety.

BRIEF SUMMARY OF THE INVENTION

The present invention is directed to a system that may include a nuclear thermal rocket, at least one nuclear electric thruster coupled to the nuclear thermal rocket, and a Nuclear Thermionic Avalanche Cell (NTAC) configured to generate electrical power. In certain examples, the NTAC cell may be positioned around a nuclear reactor core of the nuclear thermal rocket. In some examples, the at least one nuclear electric thruster may be powered by the generated electrical power. In some examples, the nuclear reactor core may be U-235 and/or Pu-239. It is well known that the nuclear fission reactions of U-235 and Pu-239, respectively, emanates 7 MeV and 7.8 MeV level gamma rays. In other examples, the nuclear reactor core may comprise a ceramic encapsulated nuclear fuel. In still other examples, the nuclear reactor core may comprise a tri-structural isotropic particle fuel. In yet another example, the NTAC may function as a radiation shield. In still other examples, the NTAC may convert gamma ray energy from the nuclear reactor core of the thermal rocket into electricity.

In another example, the NTAC may include a plurality of layers each layer comprising a collector, an insulator, and an emitter. In other examples, the collector may be positioned across a thermionic vacuum gap (TVG) or maybe correct way called as photoionic vacuum gap (PVG), and the emitter may be configured to capture primary high energy photons and energetic particles such as beta particles and induced high energy field of photons, from the nuclear reactor core of the thermal rocket. In other examples, the captured photons may free up a large number of electrons in an avalanche process from deep and intra-bands of atoms, including electrons from the outermost shell of atoms. In still other examples, a large number of avalanche electrons that are emitted from the emitter may pass through the thermionic vacuum gap and may arrive at the collector to output a high-density electrical current. In yet other examples, the electrical current may power the at least one nuclear electric thruster.

Another embodiment of this approach is directed to a system that may include a nuclear reactor, a plurality of nuclear electric thrusters coupled to the nuclear reactor, and a Nuclear Thermionic Avalanche Cell (NTAC) positioned around the nuclear reactor and configured to power the plurality of nuclear electric thrusters. In some examples, the nuclear reactor may include a U-235 core and/or a Pu-239 core. In other examples, the NTAC may be a radiation shield. In still other examples, the NTAC may be configured to capture gamma ray photons from the nuclear reactor and output a high-density avalanche electrical current. In other examples, the generated electrical current may provide power to the plurality of nuclear electric thrusters.

Yet another embodiment is directed to a method of powering a nuclear electric thruster that may include the steps of receiving primary high energy photons and energetic particles such as beta particles and induced field of high energy photos (kilo-electron volt (keV) to MeV levels), as described herein, also referred to as an induced high energy field of photons, emitted from a nuclear reactor core integrated with a nuclear thermionic avalanche cell (NTAC), outputting avalanche electrons using the received photons, guiding the avalanche electrons to cross over a vacuum gap to a collector, loading the avalanche electrons on a power circuit, generating an electrical current, and powering the nuclear electric thruster with the electrical current. In other examples, the nuclear reactor core may be a component of a nuclear thermal rocket. In other examples, the NTAC may comprise a plurality of NTAC layers that may be configured to receive the photons. In yet other examples, the NTAC layer(s) may include an emitter, a thermionic vacuum gap, and a collector. In other examples, the emitter may be positioned between the nuclear reactor core and the collector. In some examples, the nuclear reactor core may be U-235 or Pu-239. In still other examples, the NTAC may function as a radiation shield.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 4 depicts Table III showing NTAC layers and corresponding photon energies;

DETAILED DESCRIPTION OF THE INVENTION

Figure 1:
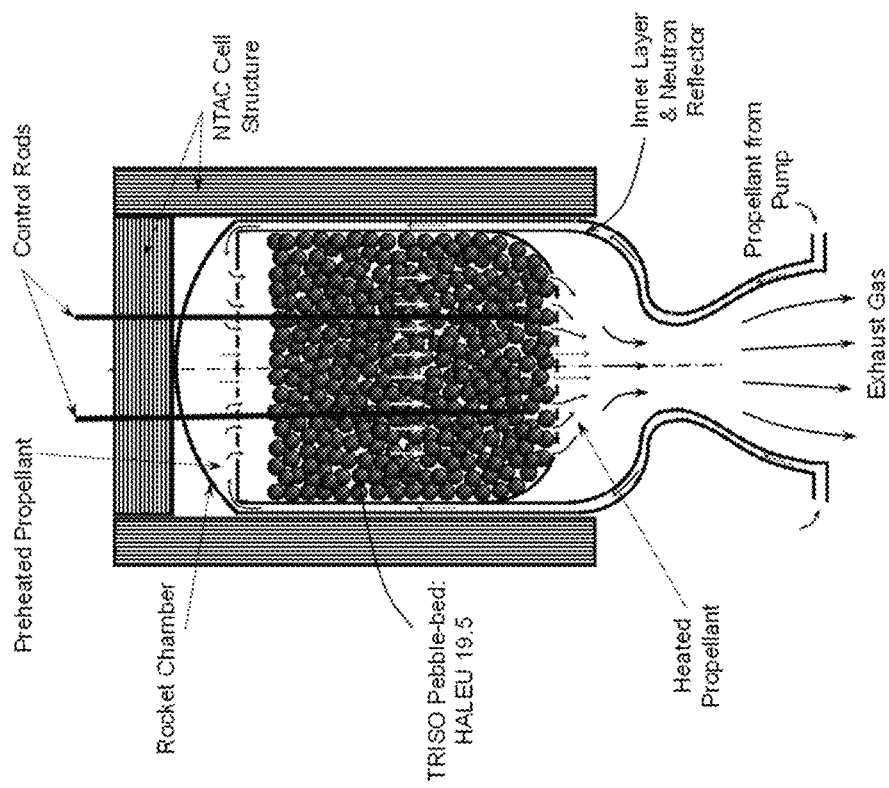
FIG. 1 is cross-sectional view of a nuclear rocket system coupled with NTAC layers that convert radiation energy to additional propulsion as disclosed herein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly include the same.

NTP and NEP thrusters are an attractive choice for long-haul travel in space, especially for travel to Mars and return to Earth. Conventional nuclear fission reactors for NTP and NEP systems typically were designed to use thermal energy generated from the fission process of large nuclei, such as uranium-235 or plutonium-239. For NEP, the thermal energy is further converted to generate electrical power. The energy released from nuclear fission process may include: kinetic energy of fission fragments, kinetic energy of prompt neutrons, energy carried by prompt γ-rays, energy of β-decay, energy of antineutrinos, energy of delayed γ-rays, and energy of γ-rays from radiative capture.

TABLE I

Energy Released from the fission reaction.

| Instantaneously released energy | Range | Material | U-233 | U-235 | Pu-239 |
|---|---|---|---|---|---|
| Kinetic energy of fission fragments [MeV] | ~µm | fuel | 168.2 | 169.1 | 175.8 |
| Kinetic energy of prompt neutrons [MeV] | 1 cm-10 cm | coolant | 4.9 | 4.8 | 5.9 |
| Energy carried by prompt γ-rays [MeV] | 10 cm-1 m | fuel, cladding, coolant | 7.7 | 7.0 | 7.8 |
| Energy from decaying fission products | | | | | |
| Energy of β-decay [MeV] | ~mm | fuel | 5.2 | 6.5 | 5.3 |
| Energy of antineutrinos [MeV] | ∞ | — | 6.9 | 8.8 | 7.1 |
| Energy of delayed γ-rays [MeV] | 10 cm-1 m | fuel, cladding, coolant | 5.0 | 6.3 | 5.2 |
| Average total energy released (without the energy of γ-rays from the radiative capture) | | | 197.9 | 202.5 | 207.1 |
| Average recoverable energy (total − antineutrinos + radiative capture) | | | 198 | 200.7 | 207 |

Table I illustrates the types of energy release from nuclear fission processes for U-233, U-235, and Pu-239. The major portion of energy released from the nuclear fission process is thermal energy (about 169.1 MeV from U-235 and about 175.8 MeV from Pu-239) represented by kinetic energy in Table I. This thermal energy can be used to heat NTP propellants to a desired temperature while passing through the reactor core. There are, however, key limits imposed on the NTP propellant heating process. One is the temperature of the propellant that may not exceed the melting points of nuclear reactor materials. Another is the shielding requirement from the prompt gamma rays (about 7 MeV) and the delayed gamma rays (about 6.3 MeV). For example, a typical nuclear engine for rocket vehicle application (NERVA) may include radiation shielding and may achieve a chamber temperature of over 2270° K (2000° C.), a chamber pressure of about 4089 KPa (593.1 psi) at a 32.7 kg/s flowrate of hydrogen propellant while the reactor was operating at its full power of about 1140 MW. The design nominal thrust was about 246,663 Newtons (55,452 lbf) with specific impulse of 710 seconds.

For NEP applications, the thermal energy from a nuclear reactor must be converted into electrical power to drive the electric thrusters. Such conversion processes are typically well-constituted with the conventional thermodynamic cycles or direct energy conversion processes, such as a magnetohydrodynamic (MHD) generator. However, the conversion cycles are known to be inefficient and can result in a loss of energy up to about 70%.

A typical feature of NTP and NEP systems is to only utilize the nuclear thermal output energy (i.e. 169.1 MeV from U-235 and 175.8 MeV from Pu-239) for propulsion. But approximately 13.3 MeV (6.5%) out of the total fission energy that comprises photon energy by the prompt and delayed gamma ray as tabulated in Table I is discarded without being utilized for propulsion. Further, conventional designs of NTP and NEP systems incorporate radiation shielding against the high energy photons yielded from respective fission reactions. Accordingly, the shielding requirement increases overall weight and complexity of NTP and/or NEP systems.

This present disclosure outlines the advantages of combining NTP or NEP systems with nuclear thermionic avalanche cell (NTAC) technologies to utilize the high energy photons from nuclear fission processes for direct power generation. A photon with energy of a kilo-electron volt (keV) or higher, such as X-rays and γ-rays, may be considered a high energy photon suitable for this purpose, An NTAC is a new nuclear battery that generates large specific powers by liberating, harnessing, and guiding a large number of intra-band electrons directly from atomic shell/band structures by high energy photons, and then into a power circuit for generating electricity. As disclosed herein, NTP and/or NEP systems may be combined with an NTAC for additional power generation. For clarity, a "large number" of avalanche electrons from the liberation of intra-band electrons of atom may be considered at least 5 to 10 times more than the number of electrons in the outermost shell of atom. In other words, the number of electrons liberated from the intra-band of high-Z atoms is a large number because it is at least 5 to 10 times more than the number of electrons in the outermost shell of high-Z atoms. High-Z atoms mean those atoms with high atomic numbers, or heavy atoms. Thus, in a method of powering a nuclear electric thruster, one step may include receiving primary high energy photons and energetic particles such as beta particles and induced field of high energy photos (kilo-electron volt (keV) to MeV levels), also referred to as an induced high energy field of photons, emitted from a nuclear reactor core integrated with such an NTAC.

In one example, an NTP system may utilize ceramic encapsulated nuclear fuel, such as that fuel sometimes called Fully Ceramic Micro-encapsulated Fuel offered by the Ultra Safe Nuclear Corporation under the FCM™ name. The ceramic encapsulated nuclear fuel FCM™ is similar in shape and composition to TRISO (TRi-structural ISOtropic particle fuel). Each TRISO particle is made up of a uranium, carbon and oxygen fuel kernel. The kernel is encapsulated by three layers of carbon-based and ceramic-based materials that prevent the release of radioactive fission products. The ceramic encapsulated nuclear fuel FCM™ features high-assay low-enriched Uranium (HALEU) ZrC-encapsulated fuel particles. This variation enables high-temperature operation while maintaining the integrity of the fuel. Conventional NTP systems may utilize TRISO fuels for nuclear fission as TRISO particles are incredibly small and very robust. Further, TRISO can be fabricated into cylindrical pellets or billiard ball-sized spheres called "pebbles" for use in either high temperature gas or molten salt-cooled reactors. TRISO pellets may be used for reactor core assembly similar to the conventional reactor configuration stacked with fuel pellets in a rod form. TRISO pebbles may be used as a fluidized bed-like reactor core, where the active gas medium passes through the pebble bed to capture thermal energy; this is a much more efficient way because the overall heat transfer surface area of pebbles is extremely large, as shown in FIG. 1, and which is thus most-likely favorable for NTP applications. Another benefit of TRISO pebble fluidized bed is that the working medium may slow down the fast neutrons. When high pressurized hydrogen gas is used as an active gas medium, hydrogen atoms can easily retard the fast neutrons into slow (thermal) neutrons through elastic collisions while passing through pebble-bed (see e.g., Table II below).

The systems and methods disclosed herein, with the NTAC utilize the photon energy of the prompt and delayed gamma rays emitted from nuclear fission processes for power generation, as shown in FIGS. 1 through 6 [3]. As listed in Table I, the summation of radiation energy compromises about 6.5% (13.3 MeV) of total energy output of the fission reaction. As shown in FIG. 1 (incorporating a TRISO pebble-bed fuel) and FIG. 2 (incorporating a conventional reactor core) the propellant flows through the nuclear core to get heated to a desired temperature. While the propellant is flowing through the core, the propellant, if it is hydrogen, also acts as a good moderator to slow down fast neutrons. Table II below shows the neutron scattering and absorption cross-sections of conventional reactor materials. Hydrogen has large scattering and absorption cross-sections that play a major role in slowing fast neutrons coming out of fission reactions.

TABLE II

Properties of Common Neutron Moderators.

| | Neutron scattering cross section ($\sigma_s$) in barns | Neutron absorption cross section ($\sigma_s$) in barns |
|---|---|---|
| Light water (H$_2$O) | 49 | 0.66 |
| Heavy water (D$_2$O) | 10.6 | 0.0013 |
| Graphite (C) | 4.7 | 0.0035 |

Another method to raise propellant temperature is via collisions between neutrons and propellant medium. For example, when energetic neutrons carrying 4.8 MeV and antineutrons with 8.8 MeV from U-235 in a fission reaction collide with propellant gaseous molecules, such as hydrogen molecules or argon atoms, the molecules gain sufficient energy from the energetic neutrons and antineutrons. For hydrogen molecules, elastic collisions prevail and slow down fast neutrons to become thermal neutrons, which require much less stringent absorption cross-sections needed for chain reactions. For heavy elements that consist of propellant, inelastic collisions are typically dominant and exchange a small portion of energy between neutrons and the heavy elements. Accordingly, energetic neutrons and antineutrons have very active roles in increasing the temperature of the propellant in addition to the kinetic energy of fission fragments as listed in Table I above.

During the fission reactions, there are not only the emissions of high energy photons at 7 MeV as prompt radiation, but also the emissions of flux delayed gamma rays at 6.3 MeV as a follow-on mechanism of the fission reactions (see Table I). These gamma rays together (7 MeV and 6.3 MeV) can fiercely penetrate through the fuels, neutron reflectors, and rocket chamber walls to escape. Conventionally, in order to shield system components from these gamma rays, conventional nuclear rockets require a radiation shielding blanket. The present systems and method disclosed herein, however, incorporate an NTAC coupled to the nuclear rockets to utilize the gamma rays for additional power by directly converting the gamma rays into electric power, and providing a secondary function as a radiation shield for system components.

Figure 3:
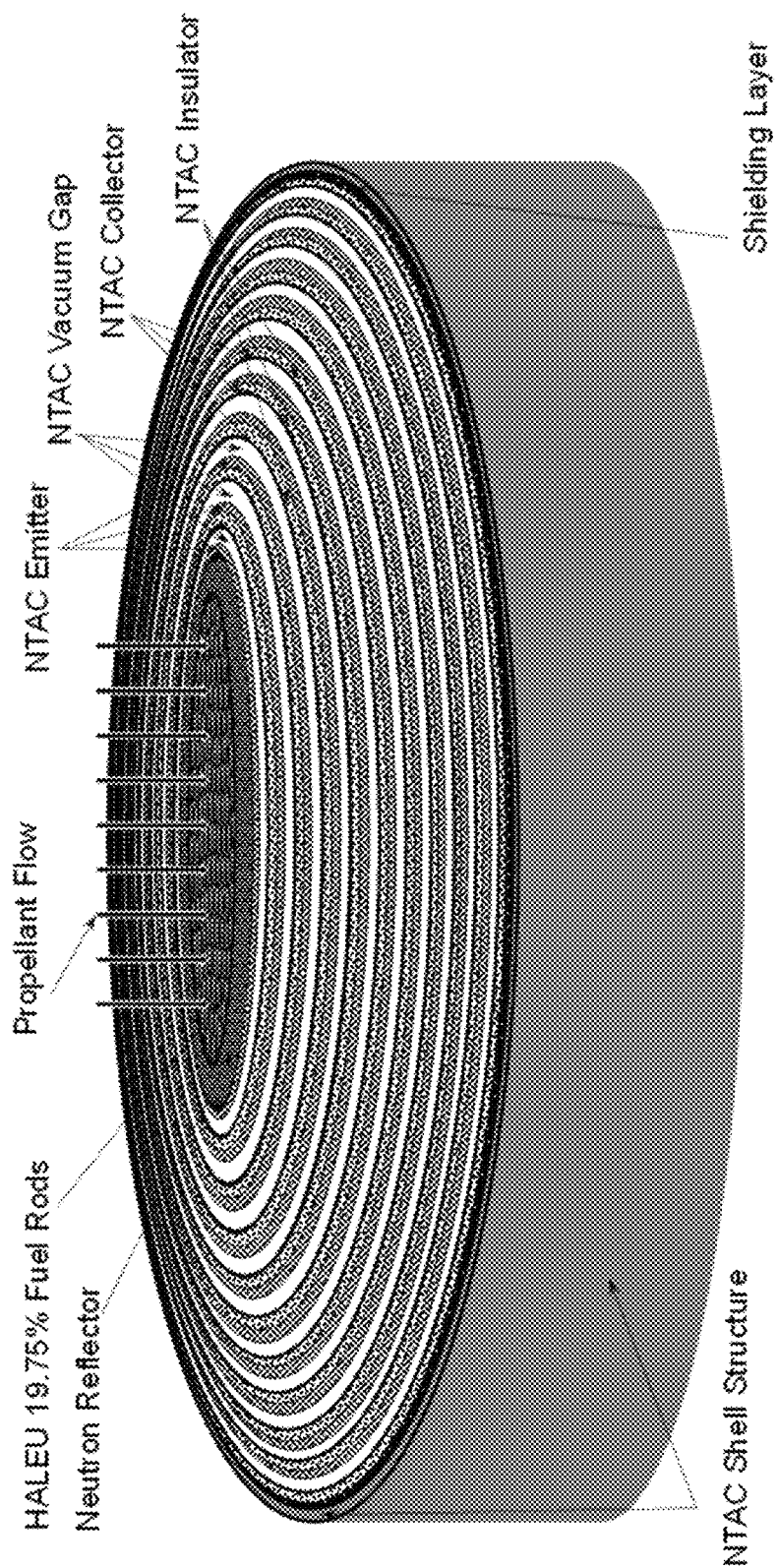
FIG. 3 illustrates a nuclear reactor encapsulated by cylindrical NTAC layers.
Figure 5:
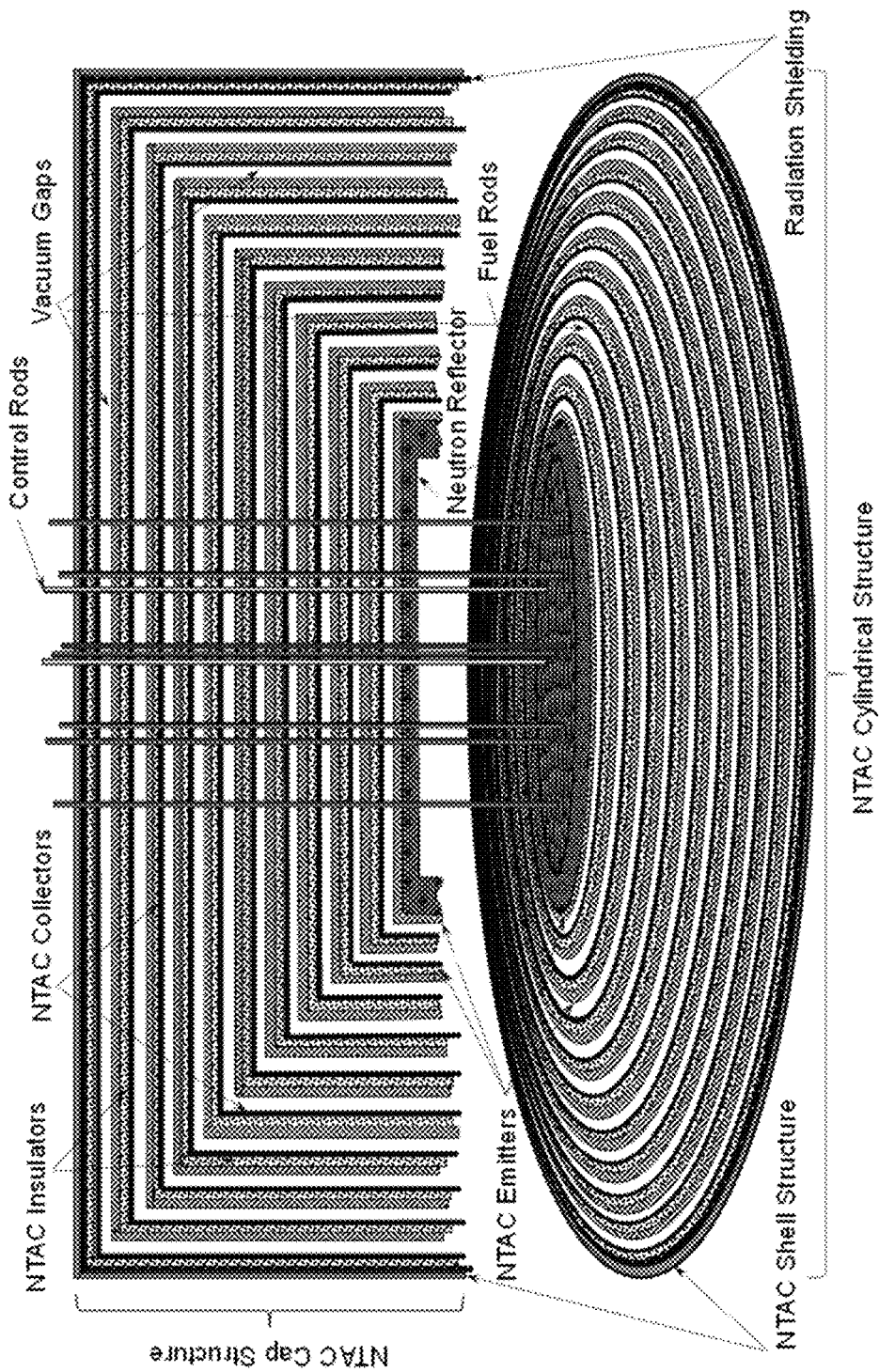
FIG. 5 is a partial cross-sectional view of a nuclear reactor encapsulated by NTAC layers with the top-cap and cylindrical structures.
Figure 6:
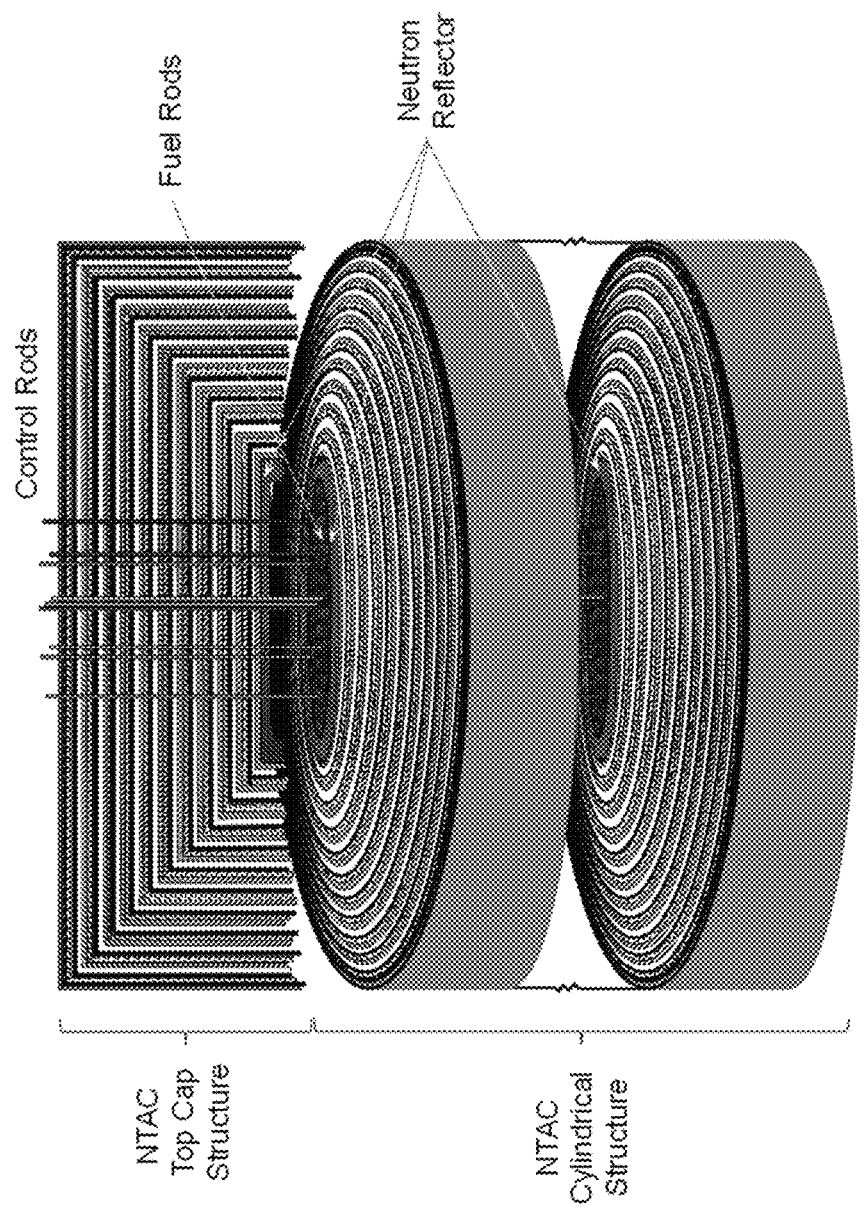
FIG. 6 is a partial cross-sectional view of an alternative embodiment of a nuclear reactor encapsulated by NTAC layers with the top-cap and cylindrical structures.

As depicted in FIGS. 3, 5, and 6, a number of NTAC layers may be employed as a conversion device structure that wraps around the nuclear rocket fuel cores. The flux of high energy gamma ray photons passing through the NTAC emitter material liberates a huge number of intraband electrons of atoms of emitter material. These avalanche electrons liberated from the emitter by gamma ray are emitted across the vacuum gap to arrive at the NTAC collector where the avalanche electrons are guided and loaded into the power circuit for generation of electricity (i.e., avalanche electrical current.) The strength of the gamma rays from the fission reaction allows several layers of NTAC to repeat the conversion of gamma ray energy into electricity, until the penetrating gamma ray becomes completely converted and diminished as shown in Table III of FIG. 4. In this regard, the NTAC layers may function as a radiation shield. The relatively large number of liberated intraband electrons enables a high-density avalanche electrical current. Normally, the mobile electrons in the conventional power generation systems come from the electrons in the outermost shell of atoms which are 2 or 3 maximum per atom. As noted above, in contrast the NTAC uses those electrons in the intraband (or inter-shells) of atoms which are 10 or 20 times more than the electrons of outermost shell electrons. Thus, the transition phenomenon intraband electrons undergo to become free or liberated through the coupling processes with high energy photons result eventually in a large number of electrons are accumulated in a domain. These accumulated free electrons in motion constitute the "avalanche". In this process, the domain size is not changed, but the number of free (or liberated) electrons is drastically increased in that conductive fixed domain. This is referred herein as a relative "high density" of free electrons in motion constituting high density avalanche current (i.e., high Coulomb transfer per second.)

Figure 2:
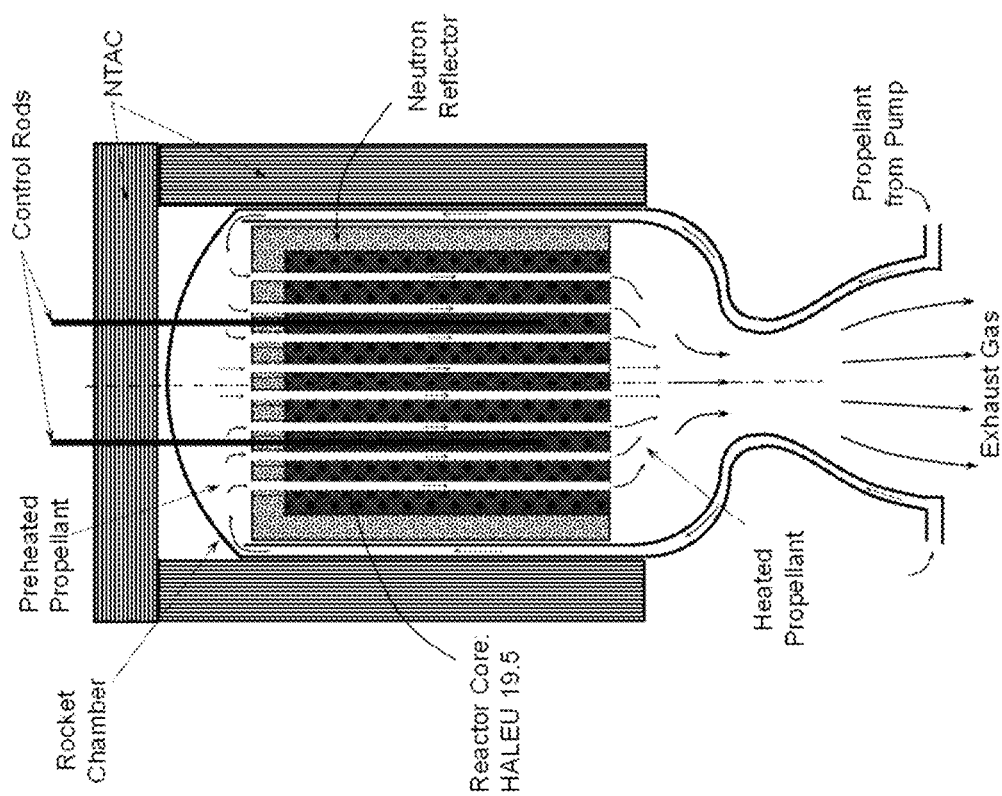
FIG. 2 is cross-sectional view of an alternative embodiment of a nuclear rocket system coupled with NTAC layers that convert radiation energy to additional propulsion.

The nuclear reactor cores, regardless of fuel type, include the same fundamental features, such as the control rods and trigger rods, within the reactor—as depicted in FIGS. 1 and 2. The fission reactors allow propellant to flow through fuel rods or pebbles as shown in FIGS. 1 and 2. The NTAC layers may include a collector, insulator, and emitter as a single pair structure, except for the first layer which is the emitter attached to the fission reactor core, and the last layer, which consists of a collector, an insulator, an NTAC outermost shell structure, and a shielding layer. The outermost layer is the radiation shielding that cuts off any possible leak through the NTAC layers. See FIGS. 3, 5, and 6.

FIG. 4 shows Table III and illustrates the estimation of how many NTAC layers may be required to directly convert all the gamma ray energy into electricity. The gamma ray sources and photon energies are listed on the first column of Table III. The second column lists the materials used for the emitters and associated absorption rates which were estimated by using National Institute of Standards and Technology (NIST) XCOM simulation code based on Monte Carlo method. The 3rd, 4th, and 5th columns together (i.e., collector, insulator, emitter) create the 1st NTAC layer and show the associated absorption rates of gamma rays. This is repeated for layer 2 through the layer 7. The last column shows the total number of NTAC layers needed to capture most of the gamma rays. The thick black vertical dividing lines signify the vacuum gaps between the layers. Based on the materials selected for the NTAC layers, the capture and use of high energy gamma ray photons for direct conversion into electricity are clearly different. For NTAC applications, preferable emitter materials may be lanthanides and actinides because these elements have an abundant number of electrons in their shells and orbitals of atomic structure. Therefore, the number and arrangement of NTAC layers, as shown in FIG. 3, for example, may be tailored along with the materials selected and the photon energy.

TABLE IV

NTAC Emitter, Collector, and Insulator with γ-absorption.

| Emitter-Collector Insulator | Photon Energy/ (MeV) | Cross Section ($cm^2/g$) | Total Absorption | PE Cross Section ($cm^2/g$) | PE Coupling | PP Coupling | Compton Coupling | (PE + CS + PP)/Total (%) | NTAC Performance Layers | Cascade % |
|---|---|---|---|---|---|---|---|---|---|---|
| Rhenium (75/126) | 0.6 | 1.045E−01 | 0.4826 | 4.062E−02 | 0.2260 | 0.0000 | 0.358 | 45.8 | 1 | 34.3% |
| | 1.25 | 5.462E−02 | 0.2914 | 8.687E−03 | 0.0533 | 0.0021 | 0.416 | 47.4 | 2 | 35.9% |
| | 7 | 4.369E−02 | 0.2408 | 6.096E−04 | 0.0038 | 0.1651 | 0.594 | 66.4 | 3 | 39.5% |
| Gold- (79/137) | 0.6 | 1.118E−01 | 0.4769 | 4.828E−02 | 0.2441 | 0.0000 | 0.391 | 51.0 | 1 | 37.0% |
| | 1.25 | 5.612E−02 | 0.2777 | 1.038E−02 | 0.0584 | 0.0021 | 0.509 | 51.8 | 2 | 38.6% |
| | 7 | 4.435E−02 | 0.2289 | 7.234E−04 | 0.0042 | 0.1500 | 0.637 | 67.4 | 3 | 40.3% |
| -Copper (29/63) (μ ? 0.1 cm) | 0.6 | 7.431E−02 | 0.0648 | 1.621E−03 | 0.0015 | 0.0000 | 0.107 | 2.3 | | |
| | 1.25 | 5.228E−02 | 0.0458 | 3.303E−04 | 0.0003 | 0.0001 | 0.097 | 0.87 | | |
| | 7 | 3.078E−02 | 0.0272 | 2.622E−05 | 0.0000 | 0.0111 | 0.028 | 40.8 | | |
| $SiO_2$ Quartz | 0.6 | 8.04E−02 | 0.0619 | 6.11E−05 | 4.85E−05 | 0.0000 | 0.0048 | 4.86E−05 | | |
| | 1.25 | 5.69E−02 | 0.0442 | 1.23E−05 | 9.75E−06 | 2.13E−05 | 0.0021 | 7.02E−04 | | |

TABLE IV-continued

NTAC Emitter, Collector, and Insulator with γ-absorption.

| Emitter-Collector Insulator | Photon Energy/ (MeV) | Cross Section (cm²/g) | Total Absorption | PE Cross Section (cm²/g) | PE Coupling | PP Coupling | Compton Coupling | (PE + CS + PP)/Total (%) | NTAC Performance Layers | Cascade % |
|---|---|---|---|---|---|---|---|---|---|---|
| (μ ? 0.3 cm) | 7 | 2.66E−02 | 0.0209 | 1.27E−06 | 1.01E−06 | 3.48E−03 | 0.0016 | 16.6 | | |

Collector ¦ 1 mm
Insulator ¦ 3 mm
Emitter ¦ 3mm

In Table IV above, the performance of the NTAC with respect to the impinging γ-ray energies of 0.6 MeV, 1.25 MeV, and 7 MeV, respectively, are estimated with the photoelectric (PE), Compton scattering (CS), and electron/positron pair production (PP) couplings. The tabulated values were obtained by the NIST XCOM Monte Carlo code for rhenium and gold as the emitters and copper as the collector and quartz as the insulator. The values calculated were just representative for the primary interactions of high energy photons through the intervening materials. The description at the bottom of the Table IV shows the thicknesses and arrangement of collector, emitter, and insulator used for the NTAC. The last column shows the combined performance of NTAC layers.

Although FIG. 3 shows the structural formation of the NTAC around the nuclear fission reactor core, further elaborated description of the NTAC structure that encapsulates a fission reactor with an NTAC cap structure is shown in FIG. 5. The cap structure of the NTAC captures and converts the vertically emanating upward high energy photons into electricity. The vertically emanating downward high energy photons, however, cannot be captured and converted into electricity because of the rocket nozzle as shown in FIGS. 1 and 2. Even though FIGS. 1 and 2 do not illustrate extension of the NTAC to cover the nozzle area, the nozzle area may be surrounded by the NTAC in other examples. Said differently, the NTAC structure may be designed to cover the nozzle down to the nozzle throat area.

Figure 7:
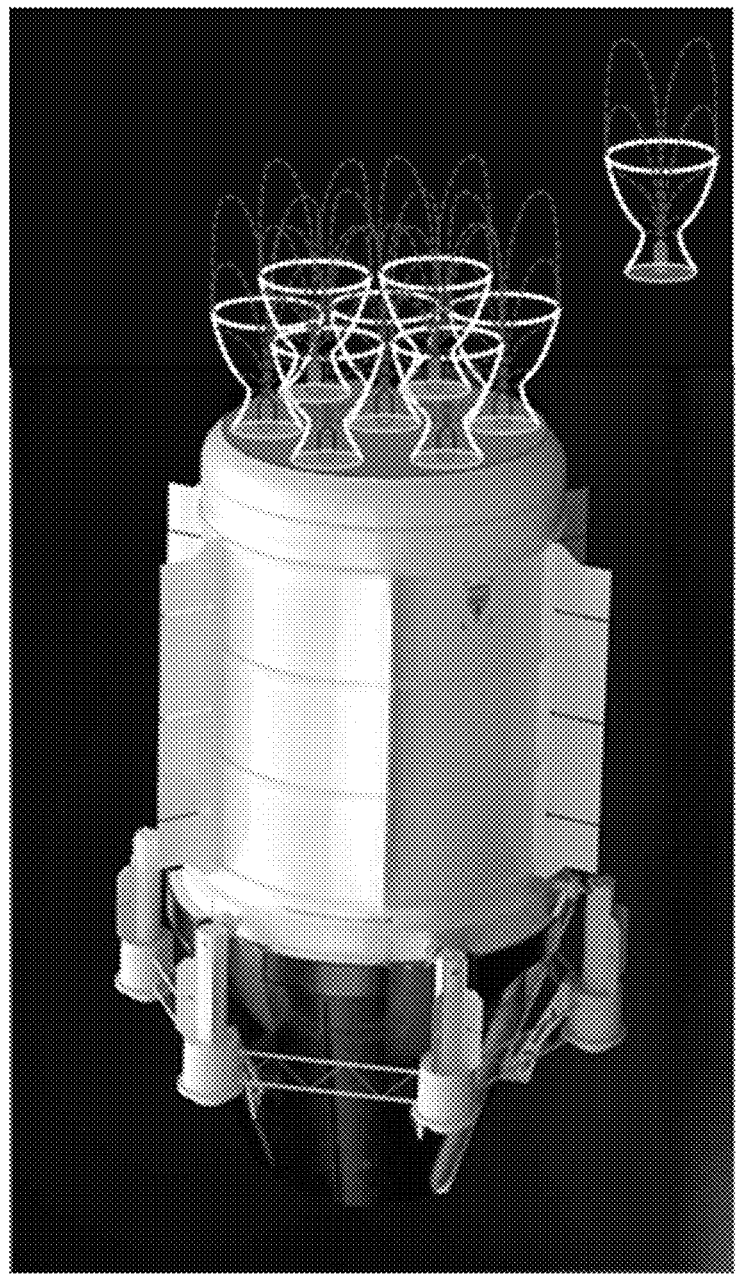
FIG. 7 illustrates a nuclear thermal rocket augmented with NTAC power sustained electric thrusters.
Figure 8:
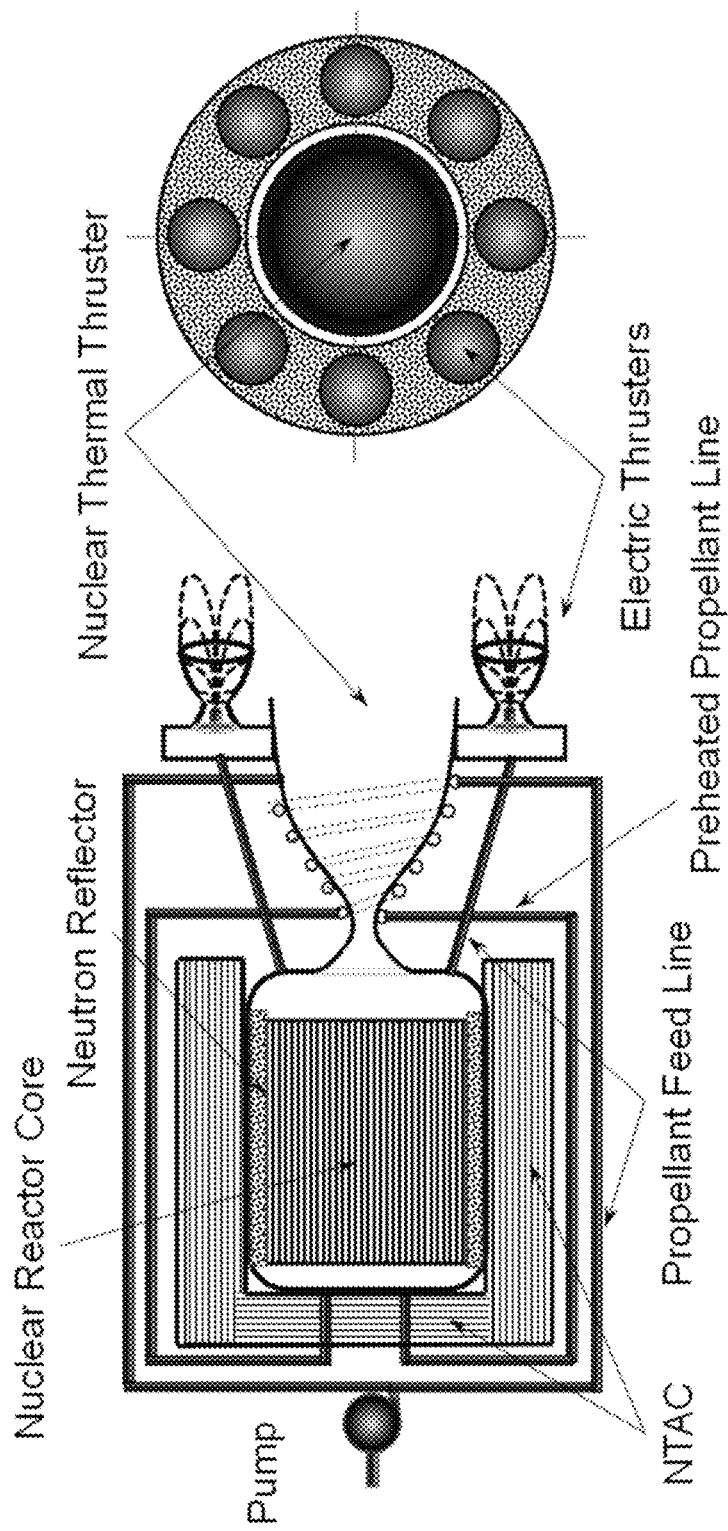
FIG. 8 illustrates a nuclear electric rocket augmented with NTAC power that sustains the electric thrusters.

A variety of nuclear rocket designs are possible as a result of the power generation capabilities of the NTAC. For example, the electrical power generated by the NTAC may drive electric propulsion thrusters only or in combination with a thermal expansion thruster. As shown in FIGS. 7 and 8, the NTP may be modified with all electric thrusters. If necessary, the thermal thruster may be included as a scaled-down version that allows some heated hot propellant to be bypassed to the augmented electric propulsion thrusters as shown in FIG. 8. The bypassed propellant that is fully heated through the reactor core is beneficial to electric thrusters because the fully heated propellant requires less power to ionize propellant. Although the ionization potentials of hydrogen (13.6 eV) and argon (15.76 eV) are quite high, pre-heated propellant may reduce the power for ionization. The ionization of hydrogen begins at or around 5000° K while high pressure argon of 4 g/cm3 and 100 GPa starts at 50000° K. This group of electric thrusters may be powered to ionize and accelerate propellant further for high specific impulse (Isp) by the NTAC generated power. In this case, the augmented electric thrusters improve the overall performance of propulsion system. Usually, the Isp of electric thrusters is an order of magnitude higher than thermal expansion thrusters. Therefore, as long as the power generated from the NTAC can meet the power requirements for electric thrusters, the design may maximize the number of electric thrusters to be augmented to NTP.

Figure 9:
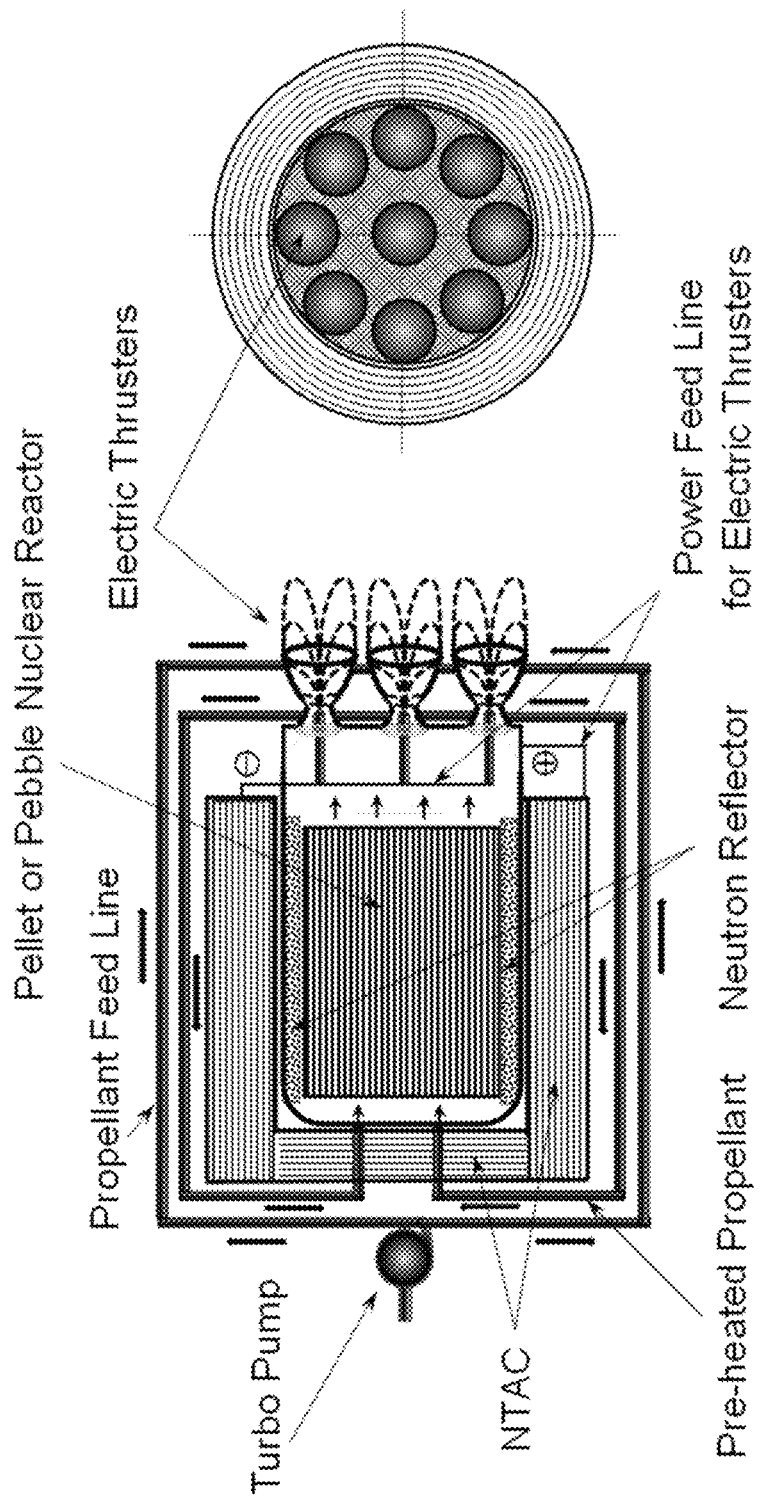
FIG. 9 illustrates a nuclear reactor coupled to an NTAC that generates power for electric thrusters.

FIG. 9 illustrates a version of an NTAC augmented NEP. In FIG. 9, the NTAC powers all electric thrusters. In this example, the nuclear thermal energy may be converted into electrical power through a certain number of conversion cycles or by a direct energy conversion method to sustain the number of electric thrusters in a cluster.

Calculation of required nuclear power accruable for the NTAC augmented NTP or NEP is critical. Based on the fission reactions required for NTP and NEP, the fission reaction rate must first be defined for the required power generation for NTP and NEP thrusters. The estimations of nuclear fission parameters and photon power are, therefore, shown here for NTP and NEP powers from 400 MW to 3000 MW that may be practically applicable for the NTAC augmented NTP and NEP thruster systems and methods of power generation disclosed herein. Other considerations may include selection of nuclear fuel such as High-Assay Low-Enriched Uranium (HALEU) with 19.75%.

Figure 10:
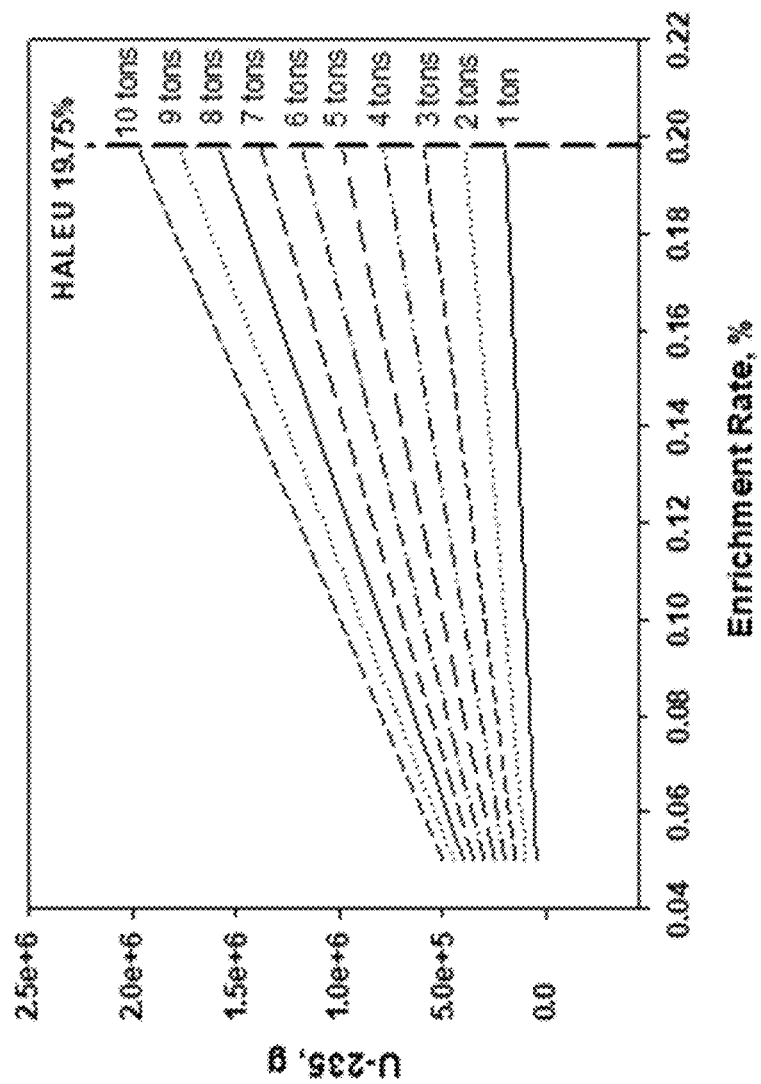
FIG. 10 graphically depicts contents of uranium-235 (U-235) within nuclear fuel based on the enrichment rate.

FIG. 10 illustrates the contents of uranium-235 (U-235) within the nuclear fuel based on the enrichment rate. The fission reaction rate is determined for overall power generation:

$$R_{fi} = \int_0^\infty \Sigma(E) \cdot \Phi(E) dE = \Sigma \cdot \Phi = \Phi \cdot N \cdot \sigma$$

where:
$\Sigma$—collision probability (atoms/cm)
$\Phi$—neutron flux (neutrons/cm²·s)
$\sigma$—microscopic cross section (cm²)
N—atomic number density (atoms/cm³)

There are several types of fission reaction rate that can be determined by the interactions associated with the appropriate cross-section:
$\Sigma_t \cdot \Phi$ total reaction rate
$\Sigma_a \cdot \Phi$ absorption reaction rate
$\Sigma_r \cdot \Phi$ radiative capture reaction rate
$\Sigma_f \cdot \Phi$ fission reaction rate.

The power, rate of energy, released is given by following equation:

$$P = R_{fi} \cdot E_r \cdot V = \Phi \cdot \Sigma_t \cdot V = \Phi \cdot N_{U235} \cdot \sigma_f^{235} \cdot E_r \cdot V$$

where:
P—reactor power output (MeV/s)
$\Phi$—neutron flux (neutrons/cm²·s)

σ—microscopic cross section (cm$^2$)

N—atomic number density (atoms/cm$^3$)

$E_r$—the average recoverable energy per fission (MeV/fission)

V— total volume of the core (m$^3$).

In order to generate the required power output from the fission reaction, the injection of thermal (slow) neutrons into uranium fuel rods is required to facilitate fission reactions. In general, the neutron-induced fission reaction is the reaction that occurs where the incident neutron enters into the heavy target nucleus (fissionable nucleus). The incident neutron is added to the fissionable nucleus to form a compound nucleus that becomes eventually so excited to a high energy level beyond the critical ($E_{excitation} > E_{critical}$). In such a case, the exceedingly high excitation energy causes the nucleus to split into two large fission fragments. Through this fission process, a large amount of energy is released in the form of radiation and fragment kinetic energy. What is crucial here is the fission process that may produce 2, 3 or more free and fast neutrons. These fast neutrons must be tampered down to slow neutrons to facilitate neutron absorption into the nucleus and at the same time those neutrons escaping from fissionable nucleus must be reflected back into the domain to trigger further fission and a chain reaction can take place. At the nuclear level, the nuclear binding energy is the energy required to hold (with the strong nuclear force) or disassemble (to overcome the strong nuclear force) a nucleus of an atom into its component parts (nucleons: protons and neutrons). Generally speaking, the protons and neutrons in an atomic nucleus are held together by the nuclear forces (strong force). However, there are many sub-atomic particles (leptons and quarks) in the nucleus doing many exquisite roles to arrange and hold protons and neutrons in balance within the domain of nucleus. The mass of a nucleus is always less than the sum of masses of the constituent protons and neutrons when separated. The difference is a measure of the nuclear binding energy (Eb) which holds the nucleus together. According to the Einstein relationship ($E=mc^2$), the binding energy is proportional to this mass difference and it is known as the mass defect.

Figure 11:
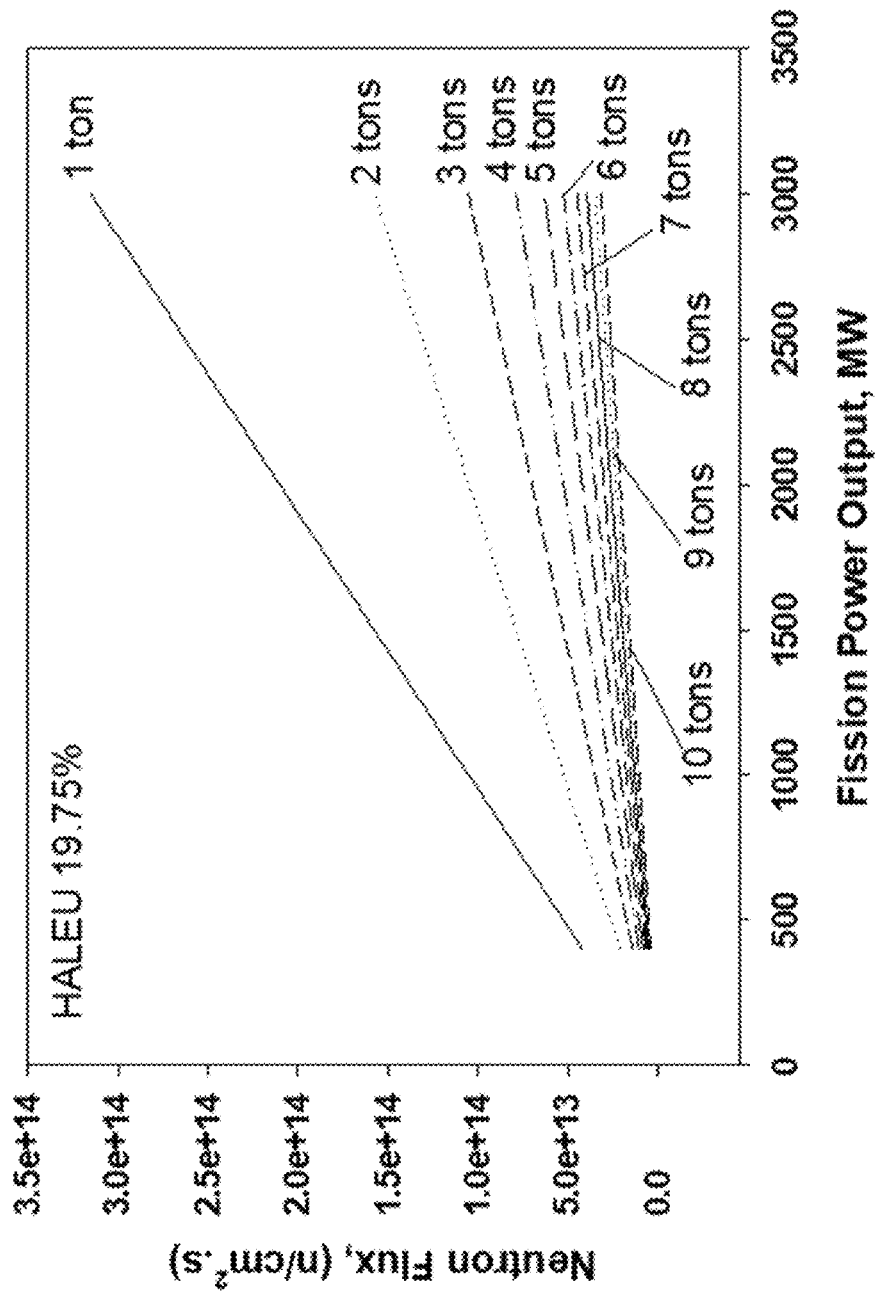
FIG. 11 graphically depicts neutron flux for uranium-235 (U-235) required to generate a desired power level.

FIG. 11 graphically depicts the required number of thermal (slow) neutrons to not only trigger fission, but also to generate the desired power level when HALEU 19.75% uranium-235 fuel is selected. Various fuel weights, 1 ton through 10 tons, were considered for generating potential power output from 400 MW to 3000 MW. When the system power requirements and the size and weight of the reactor are selected, neutron flux is determined to operate the fission process of nuclear reactor, and it is critical to also define, for the NTAC operation, the fission reaction rate.

Figure 12:
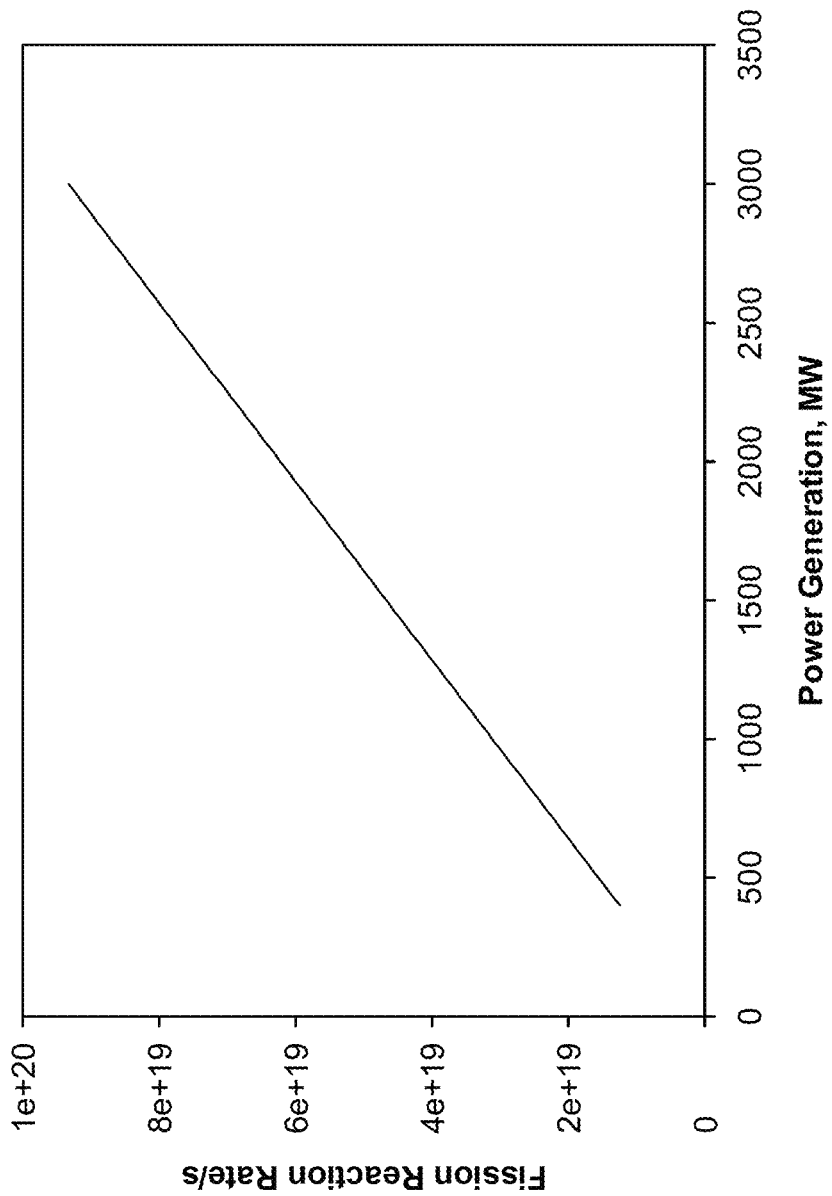
FIG. 12 graphically depicts fission reaction rates with HALEU 19.75%.

For example, FIG. 12 graphically depicts the fission reaction rate to generate a certain power from a reactor core. For example, if the power required is 2000 MW, then at least a fission reaction rate of 6×10$^{19}$ must be sustained. The operation associated with fission reaction rates is well-known with ample databases for selected enrichment rates of nuclear fuels, but the data is useful to determine how much photon power of gamma rays may be harvested from fission reactions with the augmented NTAC systems disclosed herein.

Figure 13:
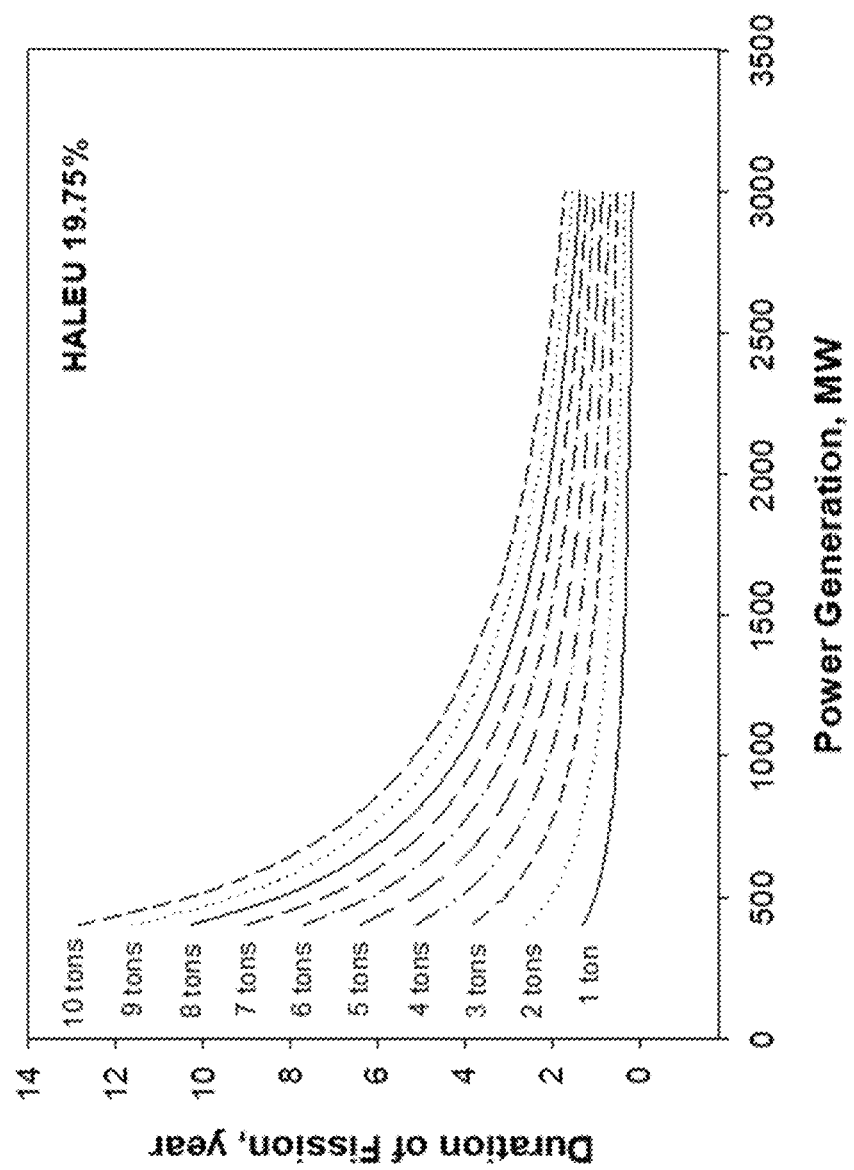
FIG. 13 graphically depicts duration of loaded fuel based on power requirements.

FIG. 13 depicts operation duration for NTP or NEP systems with HALEU 19.75% nuclear fuel when an NTP operates for a certain level of power generation. The higher the power output, the shorter the operational duration. This analysis roughly shows how much HALEU 19.75% fuel must be loaded to perform the required power output. For an NTP that operates with 5 tons of fuel loading for 1000 MW power output, the fuel can last about three years. Such a capability is advantageous for long haul space travel.

Figure 14:
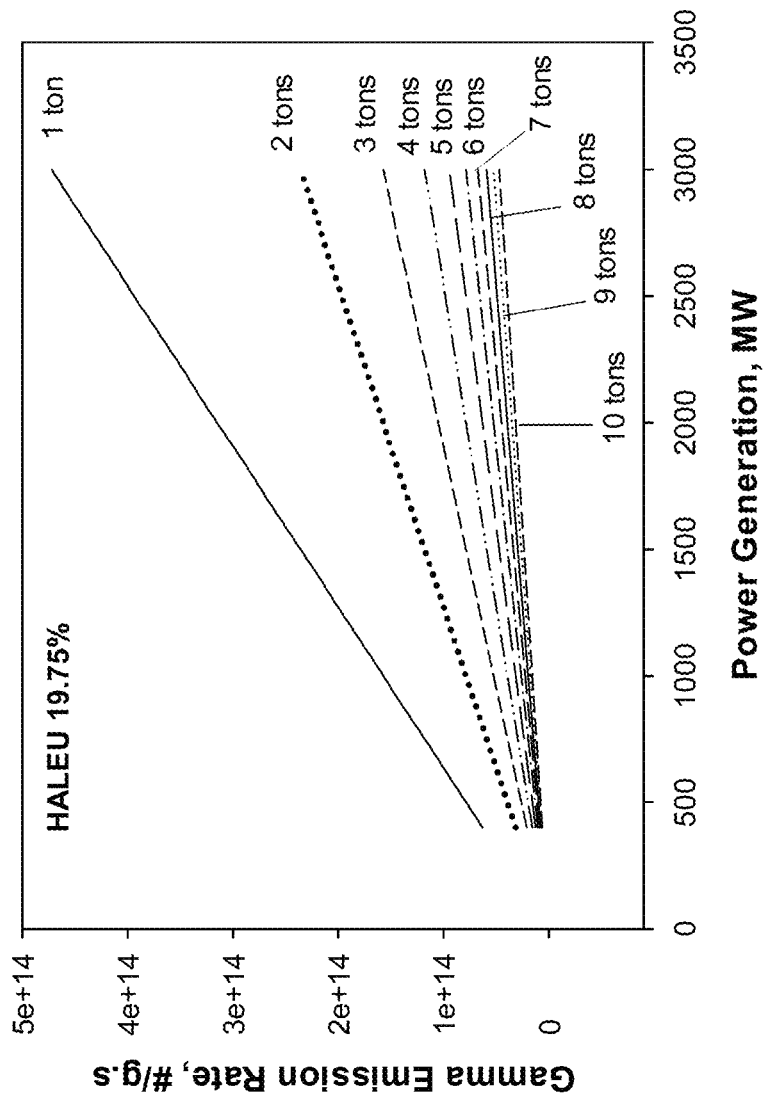
FIG. 14 graphically depicts gamma ray emission rates based on fuel consumption defined with power requirements.

Gamma ray emissions from fission reactions have two types to include the prompt (7 MeV) and the delayed (6.3 MeV) for uranium-135. FIG. 14 graphically depicts the gamma ray emission rate based on the fuel loading and power output requirement. For a certain power requirement, since smaller loaded fuel must be burned quickly, the overall emission rate of gamma rays is increased.

Figure 15:
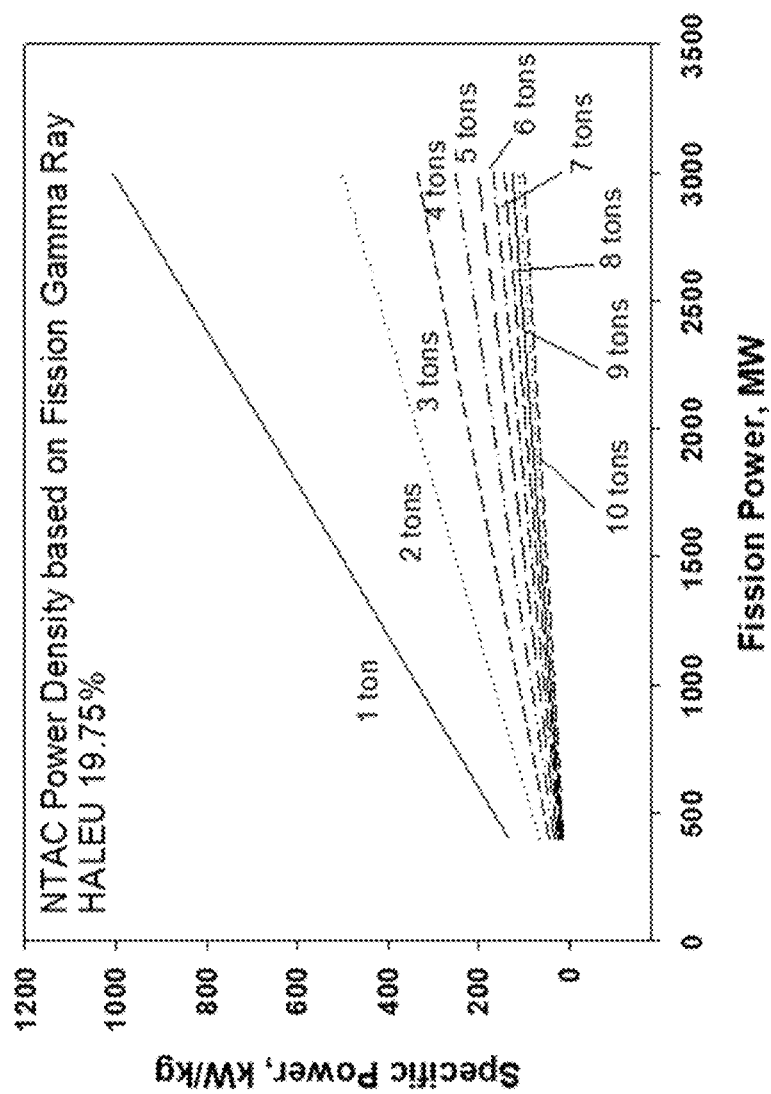
FIG. 15 graphically depicts specific power of gamma ray driven NTAC based on fuel consumption defined with power requirements.

FIG. 15 graphically depicts the specific power of gamma ray driven NTAC based on the fission fuel loading and power output level. The specific power of the NTAC is based on the fuel weight. If the overall weight of the NTAC device and fuel weight is considered, the specific power may be reduced by at least a half because the weight of the NTAC is less than the weight of the fuel. When the power output from fission reaction is about 1000 MW, the NTAC with a 1-ton fuel loaded system shows approximately 300 kW/kg. Reduced a third results in a specific power of 100 kW/kg—an excellent result and motivation to use the NTAC to augment NTP or NEP. At a 30% NTAC efficiency level, the specific weight of the NTAC is about 30 kW/kg level. Conventional systems and methods to date have not achieved such a level of specific power. The system alpha is about 0.03 kg/kW.

Figure 16:
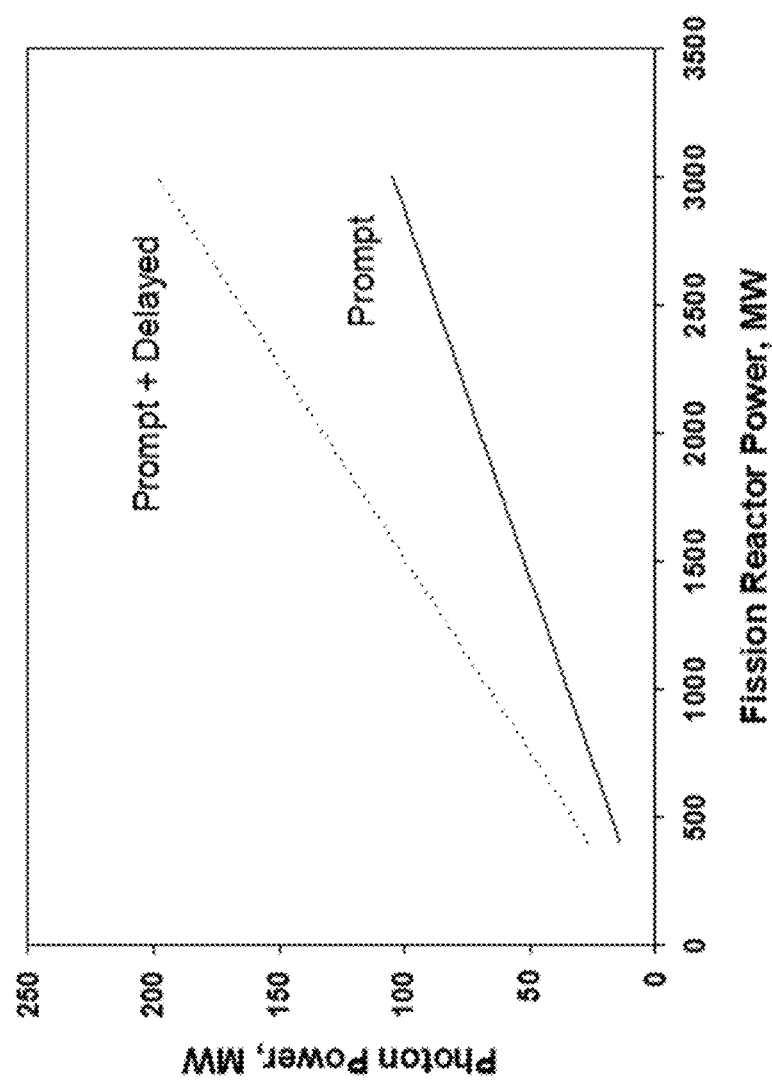
FIG. 16 graphically depicts photon power of gamma rays.

FIG. 16 depicts the photon power from nuclear fission reaction based on the power output. For example, for a 1000 MW nuclear fission system the photon power is 65 MW. The NTAC may capitalize this photon power for the generation of useful electric power. If considering an NTAC system with over 30% efficiency, the output power from the NTAC is going to be at least a 20 MW level. The photon power from a nuclear fission reaction that consists of roughly 6.5% level of fission power is formidably high and attractive for many other applications other than NTP and NEP. Assuming an average benefit margins of NTP and NEP of 60% and 20%, in terms of thermal loading/extraction factor of propellant and specific power, the additional 6.5% direct electrical output with a high specific power (based on ~150 kW/kg of 1-ton fuel weight) is a benefit margin that may possibly be provided by NTAC integration.

Figure 17A:
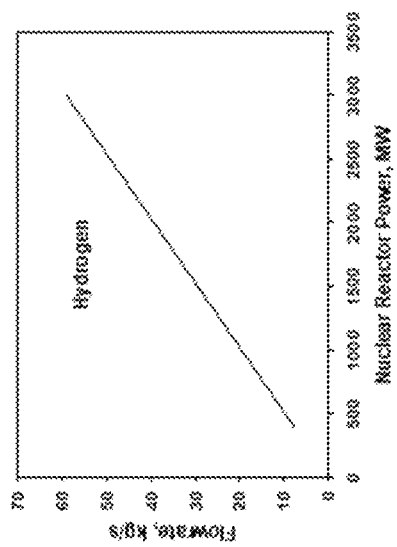
FIGS. 17A and 17B graphically depict flowrates of hydrogen and argon propellants.
Figure 17B:
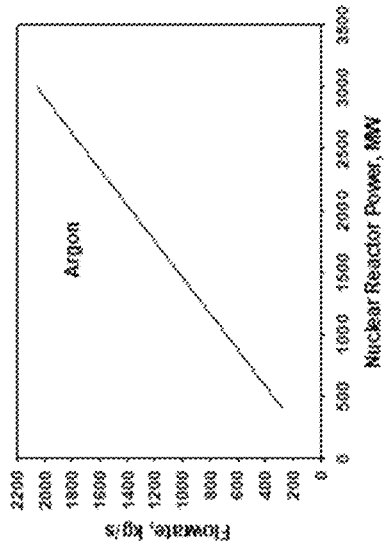

FIGS. 17A and 17B depict the flowrates of propellant for both hydrogen and argon cases, respectively. For example, a propellant heated to 2800° K while passing through the nuclear core has a corresponding flowrate of hydrogen that is much lower than argon because of much higher specific heat of hydrogen (Cp=18.17 kJ/kg·K) than argon's (0.52 kJ/kg·K). In other words, the argon gets heated about 30 times quicker to reach 2800° K than hydrogen does. The ionization potentials of hydrogen (13.6 eV) and argon (15.8 eV) are very close, although argon has a larger collision cross-section, because within the Boltzmann limit, the kinetic energy distribution of argon with a large mass is much smaller than hydrogen molecules.

Figure 18:
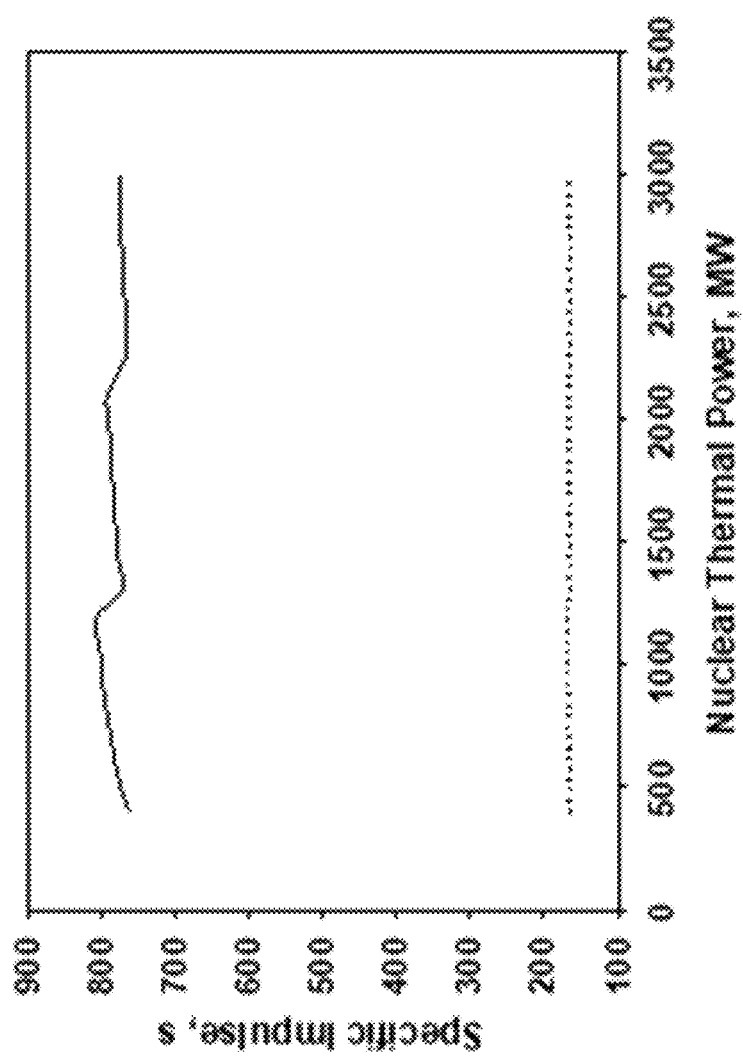
FIG. 18 graphically depicts specific impulse of hydrogen and argon propellants for NTP.

The estimation of specific impulses (Isp) for both hydrogen and argon was based upon the rocket chamber temperature at 2800° K and the associated pressure of the propellant. The results of Isp estimation for both hydrogen and argon are roughly made by calculation to find the benefits of choice for propellant. FIG. 18 graphically depicts the Isp estimated for hydrogen molecules and argon gas. It is obvious that hydrogen has much higher specific impulse compared to argon. As mentioned earlier in FIG. 17A, however, hydrogen requires an extended period to be heated to 2800° K because of the high specific heat of hydrogen.

Figure 19:
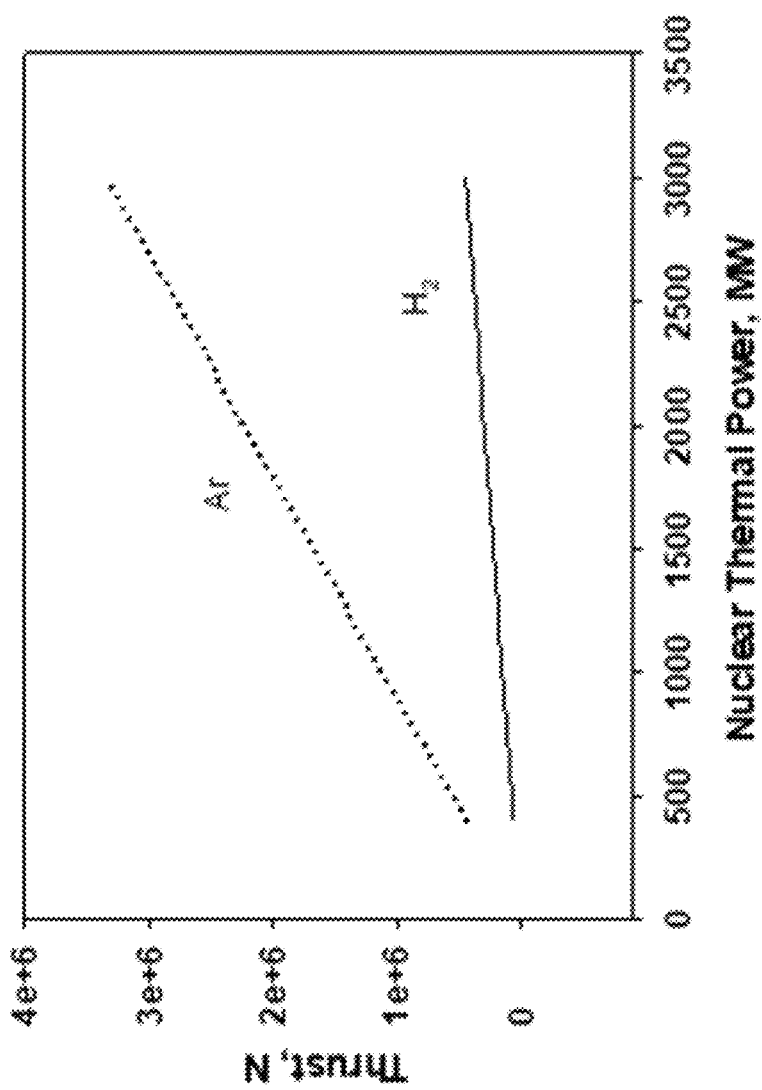
FIG. 19 graphically depicts thrust of hydrogen and argon propellants for NTP.

For long distance space travel, however, the NTP system with hydrogen propellant performs better overall than with argon propellent as a result of the high Isp and the lightweight hydrogen. FIG. 19 graphically shows the comparison of respective thrust based on hydrogen and argon propellants for NTP. Because of the high mass and flowrate of argon compared to hydrogen at the same temperature, the argon propellant for NTP provides a much higher thrust. FIG. 19, however, does not reflect that argon propellant is better than hydrogen since argon's quick heating, large mass, and large flowrate at a 2800° K constant temperature are dominant.

Figure 20B:
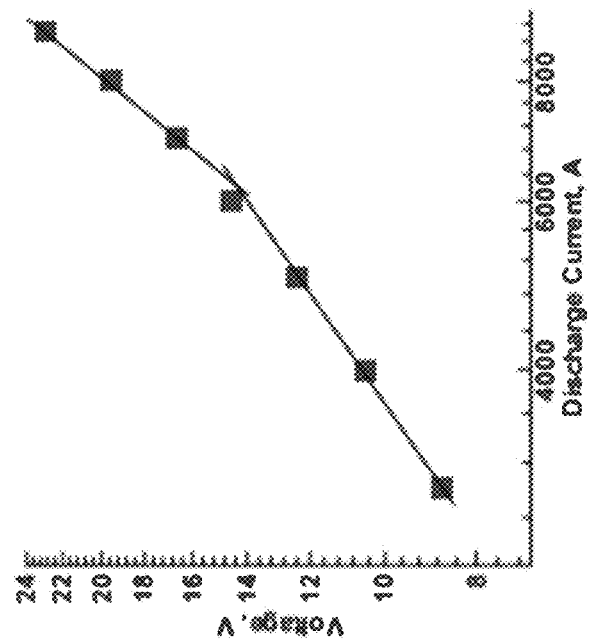
FIGS. 20A and 20B graphically depict specific impulse as a function of current mass flow rate, and voltage as a function of current.
Figure 20A:
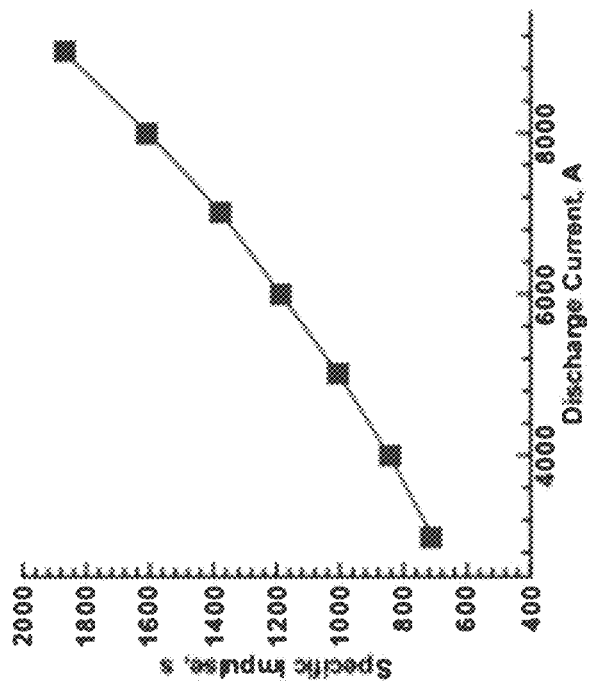

In contrast, for an NEP system application, argon propellant would perform better than hydrogen if both propellants are under the same condition in the rocket chamber due to the fact that the high thrust, as a result of argon's mass and quicker ionization, as a result of the large cross-section for collision and the large kinetic energy of argon. Further, the Isp of NEP is 3 to 7 times better than NTP's. For NEP, one of the biggest challenges is the power conversion process from thermal into electric power. Even though the conversion efficiency of nuclear fission thermal energy to electric power is approximately 30%, the Isp of argon plasma NEP is in the range of 3000 seconds to 7000 seconds which is 3 to 7 times better than hydrogen NTP. As a reference, the FIGS. 20A and 20B, published by K. Kubota, et al. illustrate the specific impulse of argon with the flowrate of 0.8 g/s. (Kubota, K., et al. "Numerical Investigation of Ionization and Acceleration Processed in a Self-Field MPD Thruster", Presented at the 29th International Electric Propulsion Conference, Princeton University, Oct. 31-Nov. 4, 2005.) At an argon flow rate of 80 g/s for NEP at 1000 MW, a specific impulse of 1800 seconds may be achieved by feeding DC electric power of 8000 A and 20V in accordance with FIG. 19. The total power may be 160 kW for driving 0.8 gram/s argon to achieve 1800 s Isp. Driving 80 g/s of argon for 1800 second Isp would require 16 MW of power. The photon power of a 1000 MW system is about 65 MW (see FIG. 16) which is sufficient to run an 80 g/s argon NEP. Therefore, with the NTAC power of 65 MW, the NTAC would provide power required for the operation of at least 4 NEP thrusters.

Specific elements of any of the foregoing embodiments or examples can be combined or substituted for elements in other embodiments or examples. Furthermore, while advantages associated with certain embodiments and examples of the disclosure have been described in the context of these embodiments, other embodiments and examples may also exhibit such advantages, and not all embodiments need necessarily exhibit such advantages to fall within the scope of the disclosure.

What is claimed is:

1. A system comprising:
   a nuclear thermal rocket comprising a nuclear reactor core and a thermal thruster;
   at least one nuclear electric thruster coupled to the nuclear reactor core by a propellant feed line that bypasses the thermal thruster; and
   a Nuclear Thermionic Avalanche Cell (NTAC) positioned around the nuclear reactor core, wherein the NTAC is a radiation shield and is configured to convert radiation energy from the nuclear reactor core to electrical power,
   wherein the at least one nuclear electric thruster is powered by the electrical power.

2. The system of claim 1, wherein the nuclear reactor core comprises U-235.

3. The system of claim 1, wherein the nuclear reactor core comprises a ceramic encapsulated nuclear fuel.

4. The system of claim 1, wherein the radiation energy comprises beta particles, gamma rays, and x-rays.

5. The system of claim 4, wherein the NTAC includes a plurality of layers each comprising:
   a collector;
   an insulator; and
   an emitter,
      wherein the emitter is configured to capture the gamma rays and x-rays;
      wherein the captured gamma rays and x-rays free up a plurality of electrons in an avalanche process; and
      wherein the plurality of electrons that are emitted from the emitter passes through a vacuum gap and arrives at the collector to output a high-density avalanche electrical current.

6. The system of claim 5, wherein the high-density avalanche electrical current powers the at least one nuclear electric thruster.

* * * * *